United States Patent
Knox et al.

(10) Patent No.: US 7,492,069 B2
(45) Date of Patent: Feb. 17, 2009

(54) PRESSURIZED BEARING SYSTEM FOR SUBMERSIBLE MOTOR

(75) Inventors: Dick L. Knox, Claremore, OK (US); George C. Soukup, Broken Arrow, OK (US)

(73) Assignee: Baker Hughes Incorporated, Houston, TX (US)

( * ) Notice: Subject to any disclaimer, the term of this patent is extended or adjusted under 35 U.S.C. 154(b) by 523 days.

(21) Appl. No.: 11/203,838

(22) Filed: Aug. 15, 2005

(65) Prior Publication Data

US 2005/0269885 A1   Dec. 8, 2005

Related U.S. Application Data

(63) Continuation-in-part of application No. 10/684,969, filed on Oct. 14, 2003, now abandoned, which is a continuation of application No. 09/838,741, filed on Apr. 19, 2001, now abandoned.

(51) Int. Cl.
*H02K 5/12* (2006.01)
(52) U.S. Cl. .................................. 310/87; 310/90
(58) Field of Classification Search ................. 310/87, 310/90, 59; 417/423.3, 423.12, 423.13
See application file for complete search history.

(56) References Cited

U.S. PATENT DOCUMENTS

| | | | |
|---|---|---|---|
| 2,315,917 A | 4/1943 | Arutunoff | |
| 2,500,400 A | 3/1950 | Cogswell | |
| 2,583,583 A | 1/1952 | Mangan | |
| 3,242,360 A | 3/1966 | Carle | |
| 3,480,810 A | 11/1969 | Potter | |
| 3,671,786 A * | 6/1972 | Jones | 310/87 |
| 3,848,702 A | 11/1974 | Bergman | |
| 4,143,999 A | 3/1979 | Ryall | |
| 4,286,185 A | 8/1981 | Erickson | |
| 4,332,524 A | 6/1982 | Smith | |
| 4,502,852 A | 3/1985 | Hazaki | |
| 4,957,504 A | 9/1990 | Chardack | |
| 5,341,901 A | 8/1994 | Mueller et al. | |
| 5,527,159 A | 6/1996 | Bozeman, Jr. et al. | |
| 5,591,016 A * | 1/1997 | Kubota et al. | 417/365 |
| 5,828,149 A | 10/1998 | Parmeter et al. | |

(Continued)

FOREIGN PATENT DOCUMENTS

DE   2941133 A1   4/1981

(Continued)

*Primary Examiner*—Dang D Le
(74) *Attorney, Agent, or Firm*—Bracewell & Giuliani LLP

(57) ABSTRACT

Pressurized lubricant is used for stabilizing shaft bearings in an electrical submersible pump motor. A lubricant pump is located within the motor housing. The lubricant pump has a set of impellers attached to a lower end of the shaft and rotating with the shaft, the impellers being located in the flow path of the lubricant. A diffuser is located upstream of and adjacent each impeller. The impellers increase the radial velocity of the lubricant, and this velocity is converted into a pressure head at the impeller outlet. The lubricant flows through the first diffuser, through the first impeller, through the second diffuser, and then flows through the second impeller and out into a reservoir. The shaft has an axial flow passage with an outlet at each bearing. The outlet has at least three ports arranged symmetrically around the shaft for discharging lubricant into a clearance between the shaft and bearing to create a fluid film.

14 Claims, 3 Drawing Sheets

U.S. PATENT DOCUMENTS

| | | | |
|---|---|---|---|
| 5,898,245 A | 4/1999 | Cochimin | |
| 5,988,996 A | 11/1999 | Brookbank et al. | |
| 6,140,725 A | 10/2000 | Jensen et al. | |
| 6,566,774 B2 * | 5/2003 | Parmeter et al. | 310/90 |

FOREIGN PATENT DOCUMENTS

| | | |
|---|---|---|
| EP | 0280660 | 8/1988 |
| GB | 1349389 | 4/1974 |
| WO | WO93/22557 | 11/1993 |

* cited by examiner

PRESSURIZED BEARING SYSTEM FOR SUBMERSIBLE MOTOR

CROSS-REFERENCE TO REALTED APPLICATION

This application is a continuation-in-part of application Ser. No. 10/684,969, filed Oct. 14, 2003, abandoned, which was a continuation of Ser. No. 09/838,741, filed Apr. 19, 2001, abandoned.

FIELD OF THE INVENTION

This invention relates generally to electrical submersible pump assemblies and particularly to a pump assembly having an internal lubricant pump in the motor that pressurizes the lubricant to stabilize bearings for the motor shaft.

BACKGROUND OF THE INVENTION

A conventional, electric, submersible pump (ESP) assembly includes an electrical motor and a rotary pump that is used to pump oil or other fluids from a well. The motor has a rotatable rotor that is contained within a stationary stator. The rotors for the submersible pumps are usually disposed in substantially vertical position by virtue of the wells often being vertical. The rotor shafts may be 30 feet or more in length, thus need radial support bearings to stabilize them and reduce vibration.

The bearings that provide radial support for the rotor shaft are often of the fluid film variety. However, fluid film bearings require a side load to provide optimal dynamic stability. Since the rotor shaft is rotating in a vertical position, there is little or no side load being applied to the bearing during operation. This causes instability in the bearings, which can result in excessive motor vibration. Excessive vibration in the bearings can cause the bearing sleeves to break through the lubricant film, resulting in metal-to-metal contact that can lead to premature wear and motor failure.

A typical motor contains an internal lubrication system that circulates lubricant from a reservoir, through a hollow motor shaft, and through passages in the shaft to lubricate the radial support bearings. The circulation occurs by reason of the rotating shaft. Normally, there is no pump, and the pressure due to the rotating shaft is low. The lubricant may also circulate through a heat exchanger and through a particle filter and/or a hygroscopic material to remove heat and contaminants from the lubricant. Although pumps being currently marketed rely on convection circulation of lubricant, prior art patents exist that show internal lubricant pumps for circulating lubricant. The circulation created by the prior art patents would not appear to provide sufficient pressure to create a fluid film between the bearings and the shaft.

Where lateral loading of a component is too low for fluid film stabilization of journal bearings, pressurization of the lubricant may be used. Stabilization occurs when a lubricant is fed into a bearing-component interface at a pressure sufficient to maintain a film between the component and the bearing even when there is minimal loading. While some pressure is developed in an ESP motor designed for lubricant circulation, it is much too low to achieve stabilization of the bearing through fluid film stabilization.

SUMMARY

A method and device are provided for stabilizing shaft bearings in a submersible well pump motor by increasing the lubricant pressure to achieve fluid-film stabilization. The assembly includes a motor having a hollow shaft and outlets communicating the shaft axial passage with the bearings A internal lubricant pump is provided in the motor for pressurizing the lubricant. The lubricant pump has a set of impellers attached to a lower end of the shaft within the motor and rotating with the shaft, the impellers being located in the flow path of the lubricant. A diffuser is located upstream of and adjacent each impeller for slowing the incoming lubricant. The impellers increase the radial velocity of the lubricant, and this velocity is converted into a pressure head at the exit of the impeller.

The lubricant flows through the first diffuser and into the inlet of the first impeller. The lubricant then flows through the second diffuser and second impeller and flows out of the outlet of the second impeller into a reservoir. The first stage pressurizes the lubricant to a pressure level, and the second stage pressurizes the lubricant to a second, higher pressure level. The pressure in the reservoir causes the lubricant to flow through the hollow shaft and through the outlets to the bearings. Each outlet has at least three ports arranged generally symmetrically around the shaft. The lubricant is pressurized to a pressure sufficient to induce a film of lubricant between the shaft and the bearings, the film preventing the shaft from contacting the bearings, thus stabilizing the bearings.

DETAILED DESCRIPTION OF THE INVENTION

Figures 1, 2:
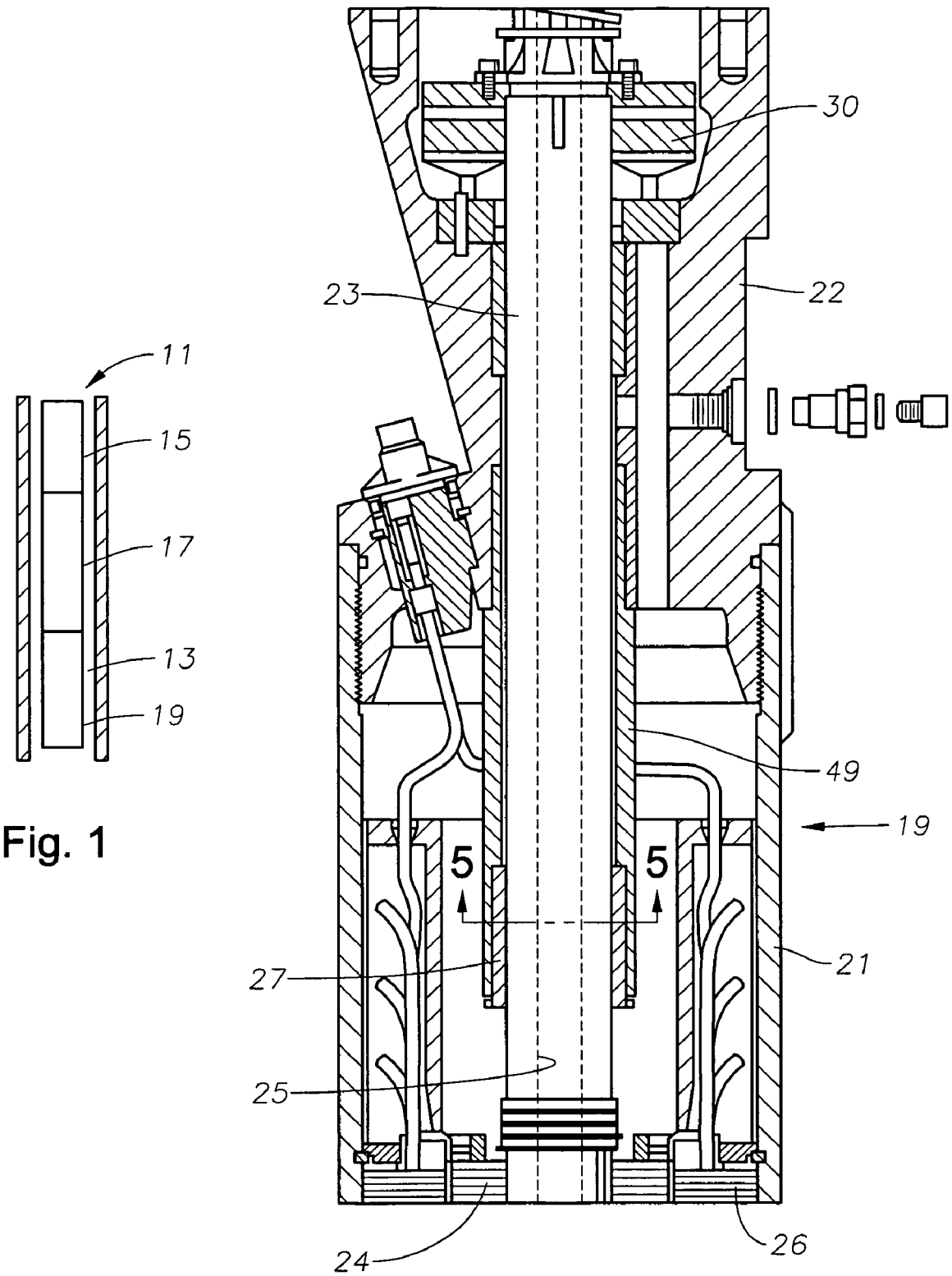
FIG. 1 is a schematic view illustrating a submersible pump assembly constructed in accordance with this invention and installed in a well.
FIG. 2 is a sectional view illustrating an upper section of the motor of the submersible pump assembly of FIG. 1.

Referring to FIG. 1, a downhole, electric, submersible pump (ESP) assembly 11 is shown installed in a well 13. ESP assembly 11 comprises a pump 15, a seal section 17, and a motor 19. Pump 15 is used to pump well fluids from within the well to the surface. Pump 15 may be a centrifugal pump having a plurality of stages, each stage having an impeller and a diffuser for imparting an upward force to the fluid. Alternatively, pump 15 may be a progressive-cavity pump having an elastomeric stator and a metal rotor that rotates within the stator. Seal section 27 reduces pressure differential between the hydrostatic pressure in the well and the pressure of lubricant contained in motor 19. Motor 19 is connected to a source of electricity by a cable or other means (not shown) for powering motor 19. Drive shaft 23 (FIG. 2) of motor 19 is coupled to shafts (not shown) within seal section 17 and pump 15 to transfer torque from motor 19 to pump 15. Motor 19 creates a torque on shaft 23 to cause the shafts to rotate, providing power to drive pump 15.

Figure 3:
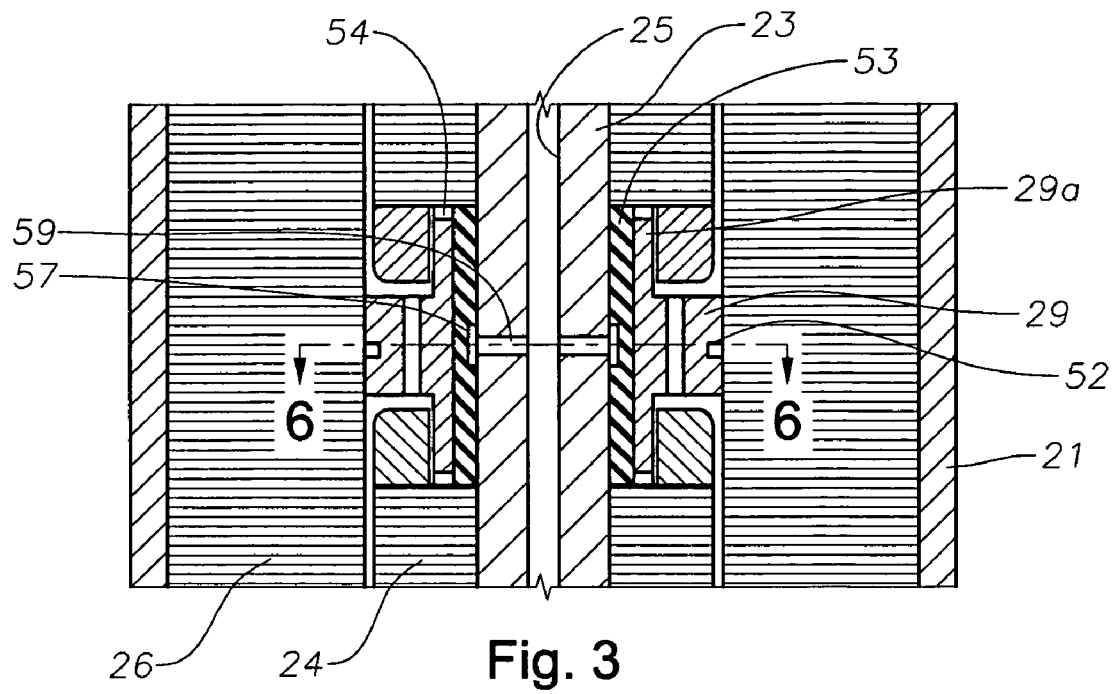
FIG. 3 is a sectional view of a central section of the motor of the submersible pump assembly of FIG. 1.
Figure 4:
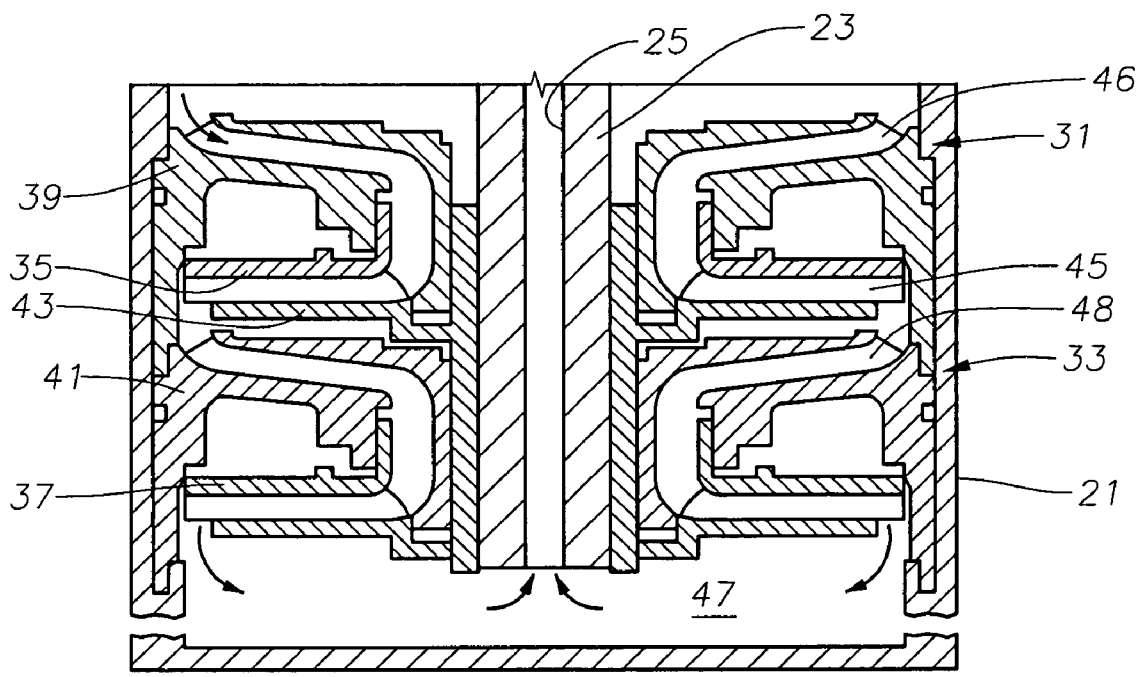
FIG. 4 is a sectional view of a lower portion of the motor of the submersible pump assembly of FIG. 1.

FIGS. 2-4 comprise a sectional view of upper, central, and lower portions of motor 19. Motor 19 has a housing 21 that surrounds components within motor 19 and protects components from contact with well fluids. Housing 21 includes an adapter head 22 on its upper end for connection to seal section 17 (FIG. 1) Motor shaft 23 is cylindrical and extends from the upper portion of motor 19 to the lower portion of motor 19. A rotor 24 is mounted to shaft 23 for rotation within a stationary stator 26. Shaft 23 contains a coaxial lubricant passage 25 through at least a portion of shaft 23 for providing lubricant to a number of radial support bearings, of which two are shown, these being an upper support bearing 27 (FIG. 2) and an intermediate support bearing 29 (FIG. 3). Radial support bearings 27, 29 center and laterally support motor shaft 23 within stator 26 and are located at various locations along the length of shaft 23. Down thrust imposed on shaft 23 is handled in this embodiment by a thrust bearing assembly 30 mounted in adapter head 22.

An internal, multi-stage, centrifugal lubricant pump has an upper stage 31 and a lower stage 33, each stage having an impeller 35, 37 and a diffuser 39, 41. Upper stage 31 increases the pressure of the lubricant to a first level, and lower stage 33 increases the pressure to a second level. The lubricant pump is located within a lower portion of housing 21 for pressurizing and circulating lubricant. Alternatively, the lubricant pump can be located within an upper portion of housing 21.

Each impeller 35, 37 comprises two circular plates 43 stacked vertically and having a plurality of vanes 45 attached to and between plates 43. Vanes 45 define separate passages between plates 43. Impellers 35, 37 are attached to and rotate with shaft 23 to draw lubricant into a central portion of impeller 35, 37 and increase the velocity of the lubricant at a discharge at a periphery. In this embodiment, impellers 35, 37 are oriented to discharge lubricant downward, however they could be oriented to discharge upward. Impellers 35, 37 are preferably straight-vane impellers which, while less efficient, would allow bidirectional operation of the pump. Impellers 35, 37 are shown to be a radial-flow type which directs the flow from the passages between the vanes radially outward. Mixed-flow impellers, which direct flow axially as well as radially, may also be employed in some cases. However, mixed-flow stages do not provide as much pressure increase as radial-flow types, instead providing more velocity.

Diffusers 39, 41 are mounted to the inner surface of motor housing 21 and are stationary relative to impellers 35, 37. Diffuser 39 is located above impeller 35, and diffuser 41 is located between impellers 35, 37. Each diffuser 39, 41 has a plurality of passages 46, 48, respectively, that lead downward and inward from a periphery to a central outlet. Each central outlet registers with the inlet of one of impellers 35, 37. Upper diffuser 39 primarily serves as an input path to upper impeller 35. Lower diffuser 41 serves to slow the lubricant being discharged by upper impeller 35 before it enters lower impeller 37, increasing the pressure head of the lubricant at the exit of upper impeller 35. Although not shown, another diffuser could be located below lower impeller 35, which would enhance performance of the lubricant pump. A fixed volume lubricant reservoir 47 is located below impeller 37.

Figure 5:
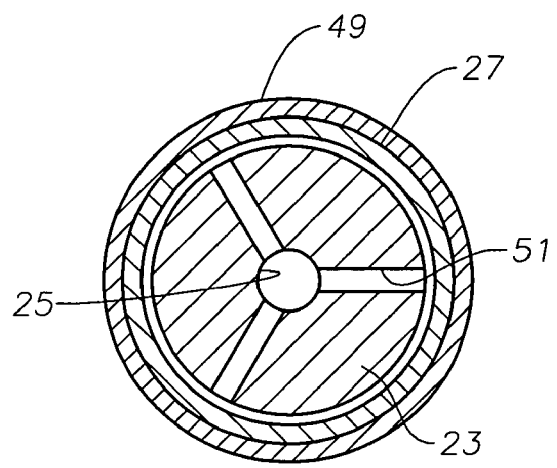
FIG. 5 is a sectional view of an upper radial support bearing of the pump assembly of FIG. 1, taken along the line 5-5 of FIG. 2.

Referring to FIGS. 2 and 5, upper bearing 27 is a journal bearing that comprises a sleeve or bushing secured against rotation within an extension member 49 of adapter head 22. A slight clearance, which is shown exaggerated in FIG. 5, exists between the outer diameter of shaft 23 and the inner diameter of upper bearing 27. The lubricant outlet at upper bearing 27 comprises three ports 51, which extend through shaft 23 radially from axial passage 25 to the exterior of shaft 23. Ports 51 are preferably located in a common plane perpendicular to the axis of shaft 23. Ports 51 are arranged generally symmetrically around shaft 23 for providing a balanced force caused by the discharge of pressurized lubricant into the clearance between bearing 27 and shaft 23. It is not necessary that the ports 51 be precisely the same circumferential distance apart, but any variance should not be so much as to create a significant unbalanced force applied by the jets of lubricant being discharged from shaft 23. In the case of three ports 51, the desired circumferential distance apart from each other is approximately 120 degrees. If four ports 51 are employed, the distance apart should be approximately 90 degrees. A balanced lateral force could not be achieved by only two ports 51, even if symmetrically spaced 180 degrees apart. The flow areas of the three ports 51 should total more than the flow area in the clearance between bearing 27 and shaft 23.

Figure 6:
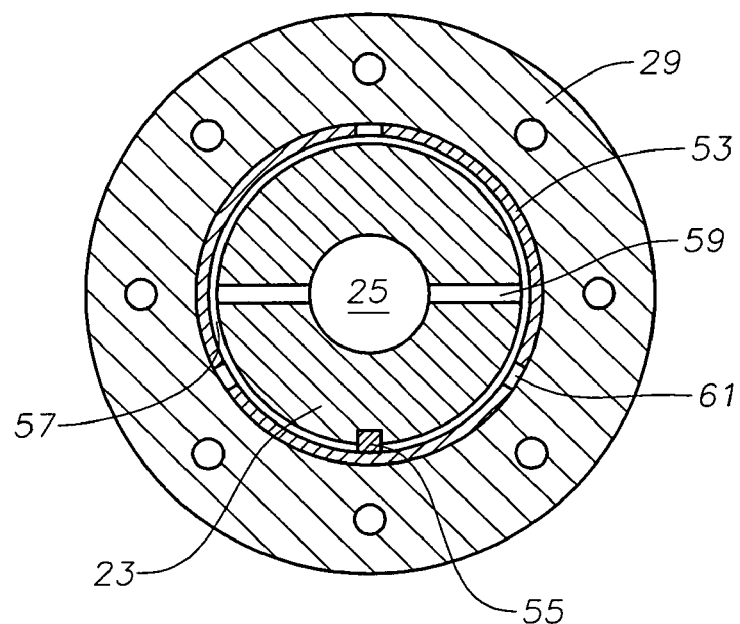
FIG. 6 is a sectional view of an intermediate radial support bearing of the pump assembly of FIG. 1, taken along the line 6-6 of FIG. 3.

Referring to FIGS. 3 and 6 intermediate bearing 29 is also a journal bearing in this example. Intermediate bearing 29 is a non rotatable member that locates within the inner diameter of stator 26. Intermediate bearing 29 is located between sections of rotor 24 and an inner hub 29a with thrust washers 54 that slidingly engage upper and lower sections of rotor 24. Intermediate bearing 29 has gripping devices 52 on its periphery for engaging the inner diameter of stator 26 to prevent rotation. Gripping devices 52 may be of any conventional type, such as a T-shaped elastomer that swells when immersed in lubricant.

Figure 7:
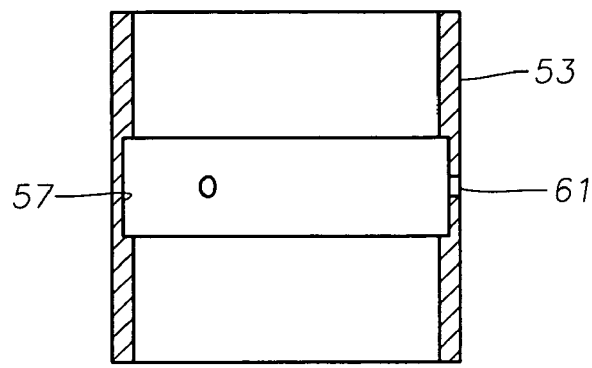
FIG. 7 is a vertical sectional view of a shaft sleeve that is secured to the shaft of the motor of the pump assembly of FIG. 1 for engaging the intermediate radial support bearing.

In this embodiment, shaft 23 has a sleeve 53 on its exterior that is secured to shaft 23 for rotation therewith by a key 55. Sleeve 53 is slightly longer than the axial dimension of hub 29a, including thrust washers 54, so that an axial forces imposed on rotor 24 pass through sleeve 53, not through hub 29a. Sleeve 53 rotates with rotor 24 and may be considered to be a part of the assembly of shaft 23. Sleeve 53 has an annular groove or recess 57 within its inner diameter, as shown particularly in FIG. 7. Shaft 23 has one or more communication ports 59 (FIG. 6) that extend from axial passage 25 to the exterior of shaft 23 within groove 57. Communication ports 59 do not need to be symmetrical because they do not do not create a lateral force against intermediate bearing 29. Sleeve 53 has three or more outlet ports 61 that extend from inner groove 57 to the exterior of sleeve 53. Outlet ports 61 are oriented radially for discharging into the clearance between the outer diameter of sleeve 53 and the inner diameter of bearing 29. Outlet ports 61 do need to be in a substantially symmetrical array for creating radially directed forces that are balanced around sleeve 53. The total flow areas of the three outlet ports 61 should exceed the flow area of the clearance between sleeve 53 and bearing 29. Bearings 27 and 29 are illustrated to be cylindrical journal bearings, but could be other types such as, for example, tri-lobe bearings.

In operation, housing 21 is vacuum-filled with a volume of lubricant, and ESP assembly 11 (FIG. 1) is assembled and inserted into well 13 (FIG. 1). Once the electrical connection to motor 19 is made, the system can be started. As motor shaft 23 starts to rotate, upper impeller 35 draws lubricant from above upper diffuser 39 and draws it through upper diffuser 39 creating a pressure head at the central outlet of diffuser 39. Upper impeller 35 increases the velocity of the lubricant as it directs the lubricant outward to the intake of lower diffuser 41. Lower diffuser 41 directs the flow radially inward and downward, increasing the pressure head. The lubricant has an increased pressure head before entering lower impeller 37. The lubricant passes out of the exit of lower impeller 37 and into reservoir 47 with a higher pressure than at the exit of the first impeller.

The increase in pressure in reservoir 47 forces the lubricant to travel up axial passage 25 and discharges at the various radial support bearings. At intermediate bearing 29 (FIG. 3), lubricant flows from communication ports 59 into groove 57, and then through outlet ports 61 (FIG. 6). The discharge from outlet ports 61 creates a symmetrical outwardly directed lateral force against the inner diameter of bearing 29. The pressure of the lubricant causes the lubricant to flow between sleeve 53 and bearing 29 and to form a film in the interface or clearance, thus stabilizing bearing 29. Similarly, at upper bearing 27 (FIGS. 2 and 5), lubricant is discharged from ports 51 in a symmetrical outwardly directed pattern against bearing 27. A fluid film is created in the clearance between upper bearing 27 and shaft 23. The pressure must be maintained above a critical level to ensure the continued stability of bearings 27. Typically, the necessary pressure ranges between 30 and 100 pounds per square inch.

The advantage of a pressurized bearing system is that metal-to-metal contact of shaft 23 and radial support bearings 27, 29 is limited or eliminated. This reduces the frequency of required replacement of bearings 27, 29 and provides for a longer run-time between failures. The present invention provides for a simple, reliable and inexpensive method of pressurization and stabilization.

While the invention is shown in only one of its forms, it should be apparent to those skilled in the art that it is not so limited, but is susceptible to various changes without departing from the scope of the invention. For example, the sleeve of the shaft assembly at the intermediate bearing could be eliminated, and the adjacent upper and lower sections of the rotor fixed axially to the shaft, such as by a retaining ring. Conversely, if desired, a sleeve could be mounted to the shaft for rotation therewith at the upper bearing.

The invention claimed is:

1. A submersible well pump assembly, comprising:
   a motor having a housing containing a stator with a central passage therethrough, the housing adapted to be filled with lubricant;
   a rotor shaft assembly located within the central passage of the stator for rotation relative to the stator;
   a plurality of radial support bearings surrounding and spaced along a length of the shaft assembly for radially supporting the shaft assembly, each of the radial support bearings comprising a stationary outer member that is separated from the shaft assembly an annular clearance;
   first and second centrifugal impellers located in the housing for pumping lubricant to the bearings, each of the impellers being attached to and rotating with the shaft assembly;
   first and second diffusers associated with the first and second centrifugal impellers, respectively;
   an axial flow passage extending axially within the shaft assembly in fluid communication with an outlet of the second impeller and second diffuser such that all of the lubricant pumped by the impellers and the diffusers flows into the axial passage;
   an outlet in the shaft assembly at each of the bearings, each of the outlets comprising at least three ports in fluid communication with the axial flow passage and arranged substantially symmetrically about the shaft assembly for discharging lubricant radially outward into the clearance at a sufficient pressure to induce a film of lubricant in each the clearances between the shaft assembly and the outer members of the bearings;
   a rotary pump coupled to the motor exterior of the housing and driven by the shaft assembly of the motor the rotary pump having an intake adapted to be in fluid communication with a well fluid for pumping the well fluid; and
   the lubricant in the motor being sealed from the well fluid.

2. The well pump assembly according to claim 1, wherein:
   the shaft assembly at a first one of the bearings comprises at least one bushing mounted to the shaft for rotation therewith; and
   the ports of the outlet at the first one of the bearings extend through a sidewall of the bushing.

3. The well pump assembly according to claim 1, wherein:
   the shaft assembly comprises a bushing mounted to the shaft assembly for rotation therewith at a first one of the bearings; wherein the outlet at the first one of the bearings comprises:
   an annular groove formed in an inner diameter of the bushing;
   a communication passage extending from the axial flow passage to the annular groove; and
   wherein the ports of the outlets at the first one of the bearings extend through a sidewall of the bushing at the annular groove.

4. The well pump assembly according to claim 1, wherein the ports of the outlet for the first one of the bearings extend from the flow passage radially through the shaft assembly to the outer diameter of the shaft assembly.

5. The well pump assembly according to claim 1, wherein:
   the impellers and diffusers have a combined capacity to produce at least 30 psi of pressure in the lubricant.

6. The well pump assembly according to claim 1, wherein:
   a chamber is located in a lower portion of the housing, the chamber containing lubricant and being fixed in volume; and
   the second impeller discharges into the chamber.

7. A well pump assembly, comprising:
   an electrical motor having a housing, a stationary stator with a central passage mounted in the housing, and a rotor shaft assembly extending through the central passage for rotation relative to the stator, the housing being filled with a lubricant;
   an intermediate bearing encircling the shaft in the central passage of the stator and having an outer periphery in stationary engagement with an inner wall of the stator;
   an upper bearing encircling the shaft above the stator and being mounted non rotatably to the housing;
   the shaft assembly being separated from an inner diameter of the intermediate bearing and an inner diameter of the upper bearing by an annular clearance;
   a chamber located in a lower portion of the housing and containing a portion of the lubricant;
   a first diffuser having a plurality of first diffuser passages having inlets and outlets, the outlets of the first diffuser passages being radially inward from the inlets;
   an axial flow passage in the shaft assembly and having an inlet in fluid communication with the chamber;
   an upper outlet in communication with the axial flow passage for discharging lubricant into the clearance between the shaft assembly and the upper bearing;
   an intermediate outlet in communication with the axial flow passage for discharging lubricant into the clearance between the shaft assembly and the intermediate bearing;
   each of the upper and intermediate outlets comprising at least three ports arranged substantially symmetrically around the shaft assembly;
   an annular return flow passage surrounding the shaft assembly and leading from the bearing to the inlets of the first diffuser passages;
   a first impeller mounted to the shaft assembly for rotation therewith and having a central intake that is in communication with the outlets of the first diffuser passages for receiving lubricant from the first diffuser, the first impeller having a plurality of first impeller passages with outlets radially outward from the central intake for discharging lubricant;

a second diffuser having a plurality of second diffuser passages having inlets in communication with the outlets of the first impeller passages for receiving lubricant therefrom, the second diffuser passages extending radially inward and having outlets;

a second impeller mounted to the shaft assembly for rotation therewith and having a central intake that is in communication with the outlets of the second diffuser passages for receiving lubricant therefrom, the second impeller having a plurality of second impeller passages with outlets radially outward from the central intake of the second impeller;

all of the lubricant being pumped by the first and second impellers and the first and second diffusers flowing into the axial flow passage in the shaft;

the first and second impellers and first and second diffusers being sized to produce sufficient pressure to induce a lubricant fluid film in the clearances;

a rotary pump exterior of the motor and connected to the shaft assembly for pumping well fluid; and a seal section between the motor and the pump for sealing the lubricant in the motor from the well fluid.

8. The well pump assembly according to claim 7, wherein:

the shaft assembly comprises a bushing mounted to the shaft for rotation therewith at the intermediate bearing;

wherein the outlet at the intermediate bearing comprises:

an annular groove formed in an inner diameter of the bushing;

a communication passage extending from the axial flow passage to the annular groove; and wherein the ports of the outlet at the intermediate bearings extend through a sidewall of the bushing at the annular groove.

9. The well pump assembly according to claim 7, wherein the upper bearing comprises:

an outer sleeve mounted stationarily in the housing, the clearance being located between an outer diameter portion of the shaft assembly and the sleeve; and wherein the ports of the outlet for the upper bearings extend from the axial flow passage radially through the shaft assembly to the outer diameter of the shaft assembly.

10. The well pump assembly according to claim 7, wherein:

the first and second impellers and diffusers have a combined capacity to pressurize the lubricant to at least 30 psi.

11. The assembly of claim 7, wherein:

the chamber has a fixed volume.

12. A method of operating a submersible well pump, comprising:

providing an electrical motor having a housing containing a stator, a rotor shaft extending through the stator, and a plurality of radial support bearings encircling the shaft;

mounting first and second centrifugal lubricant pump stages in the housing, each of the lubricant pump stages having an impeller attached to the shaft for rotation therewith and a mating diffuser;

providing the shaft with an axial flow passage and an outlet having at least three ports arranged generally symmetrically around the shaft;

filling the housing with lubricant, connecting the motor to a rotary pump, and installing the motor and the rotary pump in a well, and sealing the lubricant in the motor from the well fluid in the well;

supplying power to the motor to cause the shaft and the impellers to rotate to pump all of the lubricant flowing through the lubricant pump stages into the axial flow passage of the shaft, and causing the rotary pump to rotate to pump well fluid; and with the lubricant pump stages, applying pressure to the lubricant and discharging the lubricant from the axial flow passage through the ports at a pressure sufficient to induce a film of lubricant between the bearing and the shaft.

13. The method of claim 12 wherein the pressure of the lubricant is at least 30 pounds per square inch.

14. The method of claim 12, wherein the step of mounting at least one centrifugal lubricant pump stage in the housing comprises mounting a plurality of the pump stages within the housing.

\* \* \* \* \*